United States Patent [19]

Ko et al.

[11] Patent Number: 5,308,887
[45] Date of Patent: May 3, 1994

[54] PRESSURE-SENSITIVE ADHESIVES

[75] Inventors: Chan U. Ko, Woodbury; Mark D. Purgett, Oakdale; Kurt C. Melancon, St. Paul; Donald H. Lucast, North St. Paul; Daniel K. McIntyre, St. Paul, all of Minn.

[73] Assignee: Minnesota Mining & Manufacturing Company, St. Paul, Minn.

[21] Appl. No.: 704,380

[22] Filed: May 23, 1991

[51] Int. Cl.$^5$ .............. C08J 3/28; C08G 77/00; C08F 30/08; B32B 27/00

[52] U.S. Cl. .................. 522/148; 522/26; 522/30; 522/46; 524/506; 525/100; 525/477; 525/478; 525/479; 526/279; 528/12; 528/26; 428/446

[58] Field of Search ............... 525/477, 478, 100, 479; 528/12, 26; 526/279; 428/446; 522/148, 26, 30, 46

[56] References Cited

U.S. PATENT DOCUMENTS

| Re. 24,901 | 12/1960 | Abbott | 22/40 |
|---|---|---|---|
| Re. 24,906 | 12/1960 | Ulrich | 206/59 |
| 2,736,721 | 2/1956 | Dexter | 260/42 |
| 2,814,601 | 11/1957 | Currie et al. | 260/29.1 |
| 2,857,356 | 10/1958 | Goodwin, Jr. | 260/42 |
| 3,121,021 | 2/1964 | Copeland | 117/122 |
| 3,527,842 | 9/1970 | Clark | 260/825 |
| 3,528,940 | 9/1970 | Modic | 260/37 |
| 3,577,264 | 4/1971 | Nordstrom | 117/93.31 |
| 3,676,192 | 7/1972 | Hahn | 428/422 |
| 3,801,535 | 4/1974 | Joschko | 260/29.1 |
| 3,878,263 | 4/1975 | Martin | 260/825 |
| 3,887,669 | 6/1975 | Pillet | 264/16 |
| 3,928,489 | 12/1975 | Tomalia | 525/279 |
| 3,983,298 | 9/1976 | Hahn et al. | 428/355 |
| 4,070,526 | 1/1978 | Colquhoun et al. | 428/537 |
| 4,100,318 | 7/1978 | McCann | 428/159 |
| 4,117,028 | 9/1978 | Hahn | 260/825 |
| 4,130,708 | 12/1978 | Friedlander et al. | 528/28 |
| 4,136,250 | 1/1979 | Mueller et al. | 528/29 |
| 4,153,641 | 5/1979 | Deichert et al. | 260/827 |
| 4,158,617 | 6/1979 | Eldred | 204/159 |

(List continued on next page.)

FOREIGN PATENT DOCUMENTS

| 575664 | 5/1959 | Canada. | |
|---|---|---|---|
| 0006705 | 1/1980 | European Pat. Off. | C09D 3/82 |
| 0100147 | 2/1984 | European Pat. Off. | G10K 11/16 |
| 0152179 | 8/1985 | European Pat. Off. | C08L 83/07 |
| 0170219 | 2/1986 | European Pat. Off. | A61C 9/00 |
| 0250093 | 12/1987 | European Pat. Off. | C09J 3/14 |
| 0250248 | 12/1987 | European Pat. Off. | |
| 0289928 | 4/1988 | European Pat. Off. | C09J 3/14 |
| 0311262 | 9/1988 | European Pat. Off. | C08L 83/08 |
| 0308216 | 3/1989 | European Pat. Off. | C09J 7/02 |
| 0332400 | 6/1989 | European Pat. Off. | C08L 83/14 |
| 0355991 | 7/1989 | European Pat. Off. | C09J 183/07 |
| 0378420 | 1/1990 | European Pat. Off. | C08L 83/08 |
| 0363071 | 4/1990 | European Pat. Off. | C08L 83/08 |

(List continued on next page.)

OTHER PUBLICATIONS

JP 62 019 445 (Toyoda Gosei) 1987, Abstract.

U.S. Application Serial No. 07/450,623, "Fluorocarbon-based Coating Compositions and Articles Derived Therefrom".

(List continued on next page.)

*Primary Examiner*—Paul R. Michl
*Assistant Examiner*—Tae H. Yoon
*Attorney, Agent, or Firm*—Gary L. Griswold; Walter N. Kirn; Janice L. Dowdall

[57] ABSTRACT

The present invention provides a silicone/acrylic based pressure-sensitive adhesive composition, adhesive, and adhesive tapes prepared therefrom. The adhesive composition comprises:

(a) from about 5 parts to about 95 parts by weight of acrylic monomer wherein the acrylic monomer comprises:
 (i) from about 50 to about 100 parts by weight of alkyl acrylate monomer, the alkyl groups of which have an average of 4 to 12 carbon atoms; and
 (ii) correspondingly from about 50 parts to about 0 parts by weight of a monoethylenically unsaturated copolymerizable modifier monomer;
 wherein the amounts of (i) and (ii) are selected such that the total amount of (i) plus (ii) equals 100 parts by weight of the acrylic monomer;
(b) correspondingly from about 95 parts to about 5 parts by weight of silicone pressure-sensitive adhesive wherein the amounts of (a) and (b) are selected such that the total amount of (a) plus (b) equals 100 parts by weight;
(c) about 0 part to about 5 parts by weight of a photoinitiator based upon 100 parts by weight of the acrylic monomer; and
(d) about 0 to about 5 part by weight of a crosslinker based upon 100 parts by weight of (a) plus (b).

29 Claims, No Drawings

U.S. PATENT DOCUMENTS

| | | | |
|---|---|---|---|
| 4,181,752 | 1/1980 | Martens et al. | 427/54 |
| 4,201,808 | 5/1980 | Cully et al. | 428/40 |
| 4,223,067 | 9/1980 | Levens | 428/308 |
| 4,276,402 | 6/1981 | Chromecek et al. | 526/264 |
| 4,293,397 | 10/1981 | Sato et al. | 204/159.13 |
| 4,303,485 | 12/1981 | Levens | 204/159.24 |
| 4,304,705 | 12/1981 | Hellmann | 525/279 |
| 4,309,520 | 1/1982 | Blizzard | 525/477 |
| 4,329,384 | 5/1982 | Vesley et al. | 428/40 |
| 4,330,590 | 5/1982 | Vesley | 428/336 |
| 4,348,454 | 9/1982 | Eckberg | 428/334 |
| 4,364,972 | 12/1982 | Moon | 427/54.1 |
| 4,369,300 | 1/1983 | Carter et al. | 528/28 |
| 4,370,358 | 1/1983 | Hayes | 427/54.1 |
| 4,379,201 | 4/1983 | Heilmann et al. | 428/345 |
| 4,391,687 | 7/1983 | Vesley | 204/159.16 |
| 4,415,615 | 11/1983 | Esmay et al. | 428/40 |
| 4,477,326 | 10/1984 | Lin | 204/159 |
| 4,477,548 | 10/1984 | Harasta et al. | 430/14 |
| 4,503,208 | 3/1985 | Lin et al. | 528/15 |
| 4,504,629 | 3/1985 | Lien et al. | 525/288 |
| 4,518,794 | 5/1985 | Boutevin | 560/192 |
| 4,528,081 | 7/1985 | Lien et al. | 204/159 |
| 4,554,339 | 11/1985 | Hockemeyer et al. | 528/26 |
| 4,558,111 | 12/1985 | Tolentino | 528/26 |
| 4,561,950 | 12/1985 | Leo | 522/91 |
| 4,563,539 | 1/1986 | Gornowicz et al. | 556/421 |
| 4,568,566 | 2/1986 | Tolentino | 427/54.1 |
| 4,575,545 | 3/1986 | Nakos et al. | 526/242 |
| 4,575,546 | 3/1986 | Klemarczyk et al. | 526/245 |
| 4,584,355 | 4/1986 | Blizzard et al. | 525/477 |
| 4,584,394 | 4/1986 | Hansel et al. | 556/442 |
| 4,585,836 | 4/1986 | Homan et al. | 525/477 |
| 4,587,276 | 5/1986 | Lien et al. | 522/34 |
| 4,587,313 | 5/1986 | Ohta | 526/75 |
| 4,591,622 | 5/1986 | Blizzard et al. | 525/477 |
| 4,595,471 | 6/1986 | Preiner et al. | 522/29 |
| 4,597,987 | 7/1986 | Hockemeyer et al. | 427/54.1 |
| 4,603,086 | 7/1986 | Fujii et al. | 428/447 |
| 4,608,270 | 8/1926 | Varaprath | 427/35 |
| 4,675,346 | 6/1987 | Lin et al. | 522/39 |
| 4,678,846 | 7/1987 | Weitemeyer et al. | 525/477 |
| 4,693,776 | 9/1915 | Krampe et al. | 156/327 |
| 4,698,406 | 10/1987 | Lo et al. | 528/12 |
| 4,726,982 | 2/1988 | Trayner | 428/213 |
| 4,741,966 | 5/1988 | Cavezzen | 428/447 |
| 4,742,103 | 5/1988 | Morita | 524/174 |
| 4,748,043 | 5/1988 | Seaver et al. | 427/30 |
| 4,774,297 | 9/1988 | Murakami et al. | 525/478 |
| 4,777,276 | 10/1988 | Rasmussen et al. | 556/419 |
| 4,791,163 | 12/1988 | Traver et al. | 524/506 |
| 4,831,070 | 5/1989 | McInally et al. | 524/267 |

(List continued on next page.)

FOREIGN PATENT DOCUMENTS

| | | | |
|---|---|---|---|
| 0393426 | 5/1990 | European Pat. Off. | C09J 183/07 |
| 0390207 | 10/1990 | European Pat. Off. | |
| 0421643 | 4/1991 | European Pat. Off. | C08L 83/08 |
| 1918196 | 10/1970 | Fed. Rep. of Germany | F16F 7/00 |
| 2507196 | 12/1982 | France | C09J 7/02 |
| 2596676 | 10/1987 | France | B05D 5/10 |
| 60-197780 | 10/1985 | Japan . | |
| 62-4771 | 1/1987 | Japan | C09J 7/02 |
| 62-295982 | 12/1987 | Japan . | |
| 1-245078 | 9/1989 | Japan | C09J 7/02 |
| 1-245079 | 9/1989 | Japan | C09J 7/02 |
| 2-1785 | 1/1990 | Japan . | |
| 2-36234 | 2/1990 | Japan | C08G 77/04 |
| 2-68687 | 2/1990 | Japan | C09J 183/07 |
| 2-274783 | 8/1990 | Japan . | |
| WO90/10028 | 7/1990 | PCT Int'l Appl. | C08G 77/20 |
| 998232 | 8/1963 | United Kingdom | C08G B44d |
| 1323869 | 7/1973 | United Kingdom | C08G 47/02 |
| 2018805 | 10/1979 | United Kingdom . | |
| 2039287 | 8/1980 | United Kingdom | C08G 77/04 |
| 2109390 | 6/1983 | United Kingdom | C08G 77/26 |

OTHER PUBLICATIONS

"The Handbook of Pressure-Sensitive Adhesive Technology", (Satas, 1982) pp. 346, 348.

Test Method No. 1 (PSTC-1), Pressure Sensitive Tape Council, Glenview, IL, Seventh Edition (1976).

(List continued on next page.)

U.S. PATENT DOCUMENTS

| | | | |
|---|---|---|---|
| 4,831,080 | 5/1989 | Blizzard et al. | 525/100 |
| 4,839,206 | 6/1989 | Waldenberger | 428/40 |
| 4,889,753 | 12/1989 | Brown et al. | 428/40 |
| 4,894,259 | 1/1990 | Kuller | 427/208.8 |
| 4,895,738 | 1/1990 | Zimmerman | 427/208.8 |
| 4,898,920 | 3/1990 | Lee et al. | 525/477 |
| 4,906,695 | 3/1990 | Blizzard et al. | 525/100 |
| 4,917,929 | 4/1990 | Heinecke | 428/41 |
| 4,925,671 | 5/1990 | Abber | 424/448 |
| 4,943,613 | 7/1990 | Arai et al. | 524/773 |
| 4,943,620 | 7/1990 | Gomyo et al. | 525/474 |
| 5,006,593 | 4/1991 | Brasure et al. | 524/520 |
| 5,085,364 | 2/1992 | Ishikawa et al. | 228/139 |
| 5,091,440 | 2/1992 | Griswold | 528/26 |
| 5,118,723 | 6/1992 | Irifune et al. | 522/99 |

OTHER PUBLICATIONS

U.S. Application Serial No. 07/792/437, Radiation-Curable Silicone Elastomers and Pressure-Sensitive Adhesives.

Silicone Pressure Sensitive Adhesives for High Performance Applications, Thomas J. Tangney, Dow Corning Corporation, Midland, MI, Sep. 1986.

Formulating Silicone Pressure Sensitive Adhesives for Application Performance, Loretta A. Sobieski, Dow Corning Corporation, Midland, MI, May 1986.

Dow Corning Pressure Sensitive Adhesives, Product Information, Q2-7406 Adhesives.

Dow Corning Silicone Pressure Sensitive Adhesives, Application Information, Q2-7470 and Q2-7407 Adhesives.

Silicones, *Enc. of Polym. Sci & Eng.*, 2nd Ed., vol. 15, pp. 296-297.

Silicones, *Enc. of Polym. Sci & Eng.*, 1st Ed., pp. 541, 544-552.

Bull. Chem. Soc. Japan 41(10), 1968, pp. 2521-2523.

Adhesives Age, Mar. 1979, pp. 39-41, Dow Corning Product Information.

Dialog Abstract-JP 63291969, Adhesive Coating Technology-Tech. Seminar Jun. 1980.

EP 58909 Abstract.

EP 159683 Abstract.

WO 881020 Abstract.

PRESSURE-SENSITIVE ADHESIVES

FIELD OF THE INVENTION

This invention relates to pressure-sensitive adhesive compositions, adhesives, and adhesive tapes, specifically silicone/acrylic-based pressure-sensitive adhesives.

BACKGROUND OF THE INVENTION

Pressure-sensitive adhesives (PSAS) have been known and used for a long time in the art. Some of the common pressure-sensitive adhesives are formulations based upon acrylates, natural rubbers, synthetic rubbers, vinyl acetates, and silicones. The PSAs are typically formulated for end use, often in a solvent or waterborne system. Acrylate PSAs are of particular utility in that they are relatively low in cost, adhere well to a variety of different surfaces, and can be formulated to build adhesion to a surface. However, acrylate PSAs typically have poor high temperature performance and poor low temperature performance. Examples of such acrylate PSAs are disclosed in U.S. Pat. No. Re 24,906 (Ulrich).

In recent times, there has been a need to reduce solvent pollution by using solventless systems in order to prepare pressure-sensitive adhesives. Substantially solvent free acrylate pressure-sensitive adhesives are disclosed in U.S. Pat. No. 4,181,752 (Martens) wherein alkyl acrylate esters and modifying copolymerizable monomers are ultraviolet radiation polymerized to form the acrylate copolymer. The PSAs made by the disclosed process are improved over those made by solution polymerization but are still not completely adequate for some uses such as adhesion at high and low temperature extremes.

Silicone PSAs exhibit the flexibility of silicone rubber and the high temperature stability of silicone resin, thereby providing useful service temperatures ranging between −70° C. and 250° C. Their excellent electrical properties and chemical inertness are noteworthy attributes making them suitable for use in the plating and electronics industry. Silicone PSAs bond to a wide variety of substrates including surfaces having high or low surface energies; e.g., glass, paper, polyolefins, polytetrafluoroethylene, fluorohalocarbon films, and silicone release liners. Most acrylic PSAs will not bond, or adhere poorly, to many of these low energy surfaces, while silicone PSAs are effective bonding agents for these materials. Silicone PSAS, due to their biocompatibility, are widely used in transdermal drug delivery systems and also as general medical adhesives.

Silicone PSAS, however, have a number of disadvantages including the following. First, silicone PSAs are expensive. Second, most silicone PSAs are solvent-based, which limits the thickness at which they may be coated. Third, silicone PSAs are slow to cure due to the need for a solvent removal step prior to crosslinking at temperatures in excess of 130° C. In addition, silicone PSAs generally have low tack and limited adhesion build.

Combining silicone PSAs and acrylate PSAs to achieve specific properties has been attempted. JP 62-295982 (murachi) describes an automotive protective molding having a pressure-sensitive adhesive made by combining a silicone pressure-sensitive adhesive and an acrylate pressure-sensitive adhesive with a polyurethane or polyisocyanate crosslinker. The PSAs are solvent based. The problem addressed by the publication is to obtain a pressure-sensitive adhesive that has high shear strength to resist separation of the adhesive from the molding because of expansion and contraction of the molding due to changes in temperatures. Disadvantages of this adhesive system are a limited pot life in coating the adhesive because of the crosslinker, shelf stability of the coated product which may be affected by the crosslinker, and the need to dry off large amounts of organic solvent since the silicone and acrylic pressure-sensitive adhesives are initially 40% and 37% solids, respectively, and are further diluted with solvent as shown in the examples.

U.S. Pat. No. 4,791,163 (Traver) describes an emulsion pressure-sensitive adhesive comprising from 50 to 99% of an organic pressure-sensitive adhesive and from 1 to 50% of a silicone pressure-sensitive adhesive. The solvent based silicone pressure-sensitive adhesive in solvent is emulsified and the resulting emulsion is added to an acrylic emulsion pressure-sensitive adhesive, thereby providing an emulsified composition, however, said composition contains significant levels of solvent introduced via the silicone PSA. Careful control of the emulsifying agent and the drying conditions is required to prevent phase separation of the emulsion during the drying step. Again, large amounts of energy are required to dry the emulsion to a pressure-sensitive adhesive.

European Patent Publication No. 289928 (General Electric), published Nov. 9, 1988, describes an emulsion or solution comprising: (a) 100 parts by weight of water or organic solvent; (b) from about 10 to about 400 parts by weight of pressure-sensitive adhesive comprising: (i) from about 50 to about 99% by weight organic pressure-sensitive adhesive; and (ii) from 1 to about 50% by weight of silicone pressure-sensitive adhesive; and (c) an effective amount of organic peroxide or alkoxy silane cross-linking agent to increase the shear strength of the composite adhesive through crosslinking of the silicone. The emulsion generally requires the use of an emulsifying agent or agents to maintain both the micelles of silicone adhesive and micelles of organic adhesive in a substantially stable state of suspension even at low water content, so that drying may be accomplished prior to gross phase separation of the silicone adhesive and the organic adhesive.

JP 61-57355 discloses solvent based adhesives having a silicone pressure-sensitive adhesive, an acrylate pressure-sensitive adhesive, and an organic peroxide crosslinking agent to prevent phase separation. This publication discloses that isocyanate crosslinkers are not desirable because it does not prevent phase separation of the acrylic and silicone PSA'S. The examples show that the PSA needs to be cured at 150° C. for 3 minutes.

JP 63-291971 discloses solvent based adhesives that are a mixture of silicone pressure-sensitive adhesive, acrylate pressure-sensitive adhesive, a bridging agent, and a "silicone macromonomer". The adhesives disclosed in this publication have poor shear strength without the "silicone macromonomer." This publication also states that adhesives made as disclosed in JP 61-57355 have poor adhesion.

A need thus exists for a PSA system which has the advantages of both acrylate PSAs and silicone PSAs which requires little or no solvent, thereby reducing or eliminating the environmental and health hazards associated with solvent use, as well as the need for drying.

A need also exists for such a PSA system which is curable by an energy efficient means such as radiation and which, unlike most known silicone acrylate systems, is not prone to gross phase separation problems. A need also exists for a silicone/acrylic PSA system which possesses balanced PSA properties tailorable over a wide range, thereby providing greater flexibility than known systems in achieving substrate-specific adhesion.

The inventors of the present invention have discovered an adhesive composition having excellent adhesion to a broad range of substrates over a broad temperature range. The adhesive composition is virtually solvent-free and can be efficiently cured by exposure at ambient temperatures to a number of radiation sources including those capable of emitting ultraviolet radiation, electron beam radiation, actinic radiation, and gamma radiation. Preferably, the adhesive compositions is cured via ultraviolet radiation. Ultraviolet radiation can be provided by various sources having emission spectra between about 250 to about 400 nanometers depending upon the initiators and crosslinkers that are used.

The adhesive compositions of the invention are useful in making pressure-sensitive adhesive transfer tapes or coated adhesive tapes.

The adhesives of the invention exhibit excellent adhesion to the new paints in use in the automobile industry as well as superior resistance to detachment at low temperatures as compared to known acrylic adhesives.

The adhesives of the invention exhibit utility in the attachment of body side molding, decorative trim, weatherstripping, and the like, to automobile surfaces painted with the new paints that are in use in the automotive industry. These new paints are formulated for environmental conservation, enhanced appearance, and durability, such as resistance to degradation from common sources of contamination such as acid rain. The changes in the paint formulations have increased the difficulty with which known acrylate pressure-sensitive adhesives can adhere to substrates coated with such paints. The automobile industry requires that the adhesive, or a tape made with the adhesive, have good adhesion to the paint surface and the molding, and resist detachment at temperatures as low as −40° C. The adhesives of the present invention meet these stringent requirements of the automotive industry.

The adhesives of the invention also show great utility in medical applications because the adhesion build on human skin is sufficient but not excessive, thus facilitating the removal of a bandage coated with the adhesive from human skin.

SUMMARY OF THE INVENTION

The present invention provides a radiation curable pressure-sensitive adhesive composition comprising:
 (a) from about 5 parts to about 95 parts of acrylic monomer wherein the acrylic monomer comprises:
  (i) from about 50 to about 100 parts of alkyl acrylate monomer, the alkyl groups of which have an average of 4 to 12 carbon atoms; and
  (ii) correspondingly from about 50 parts to about 0 parts of monoethylenically unsaturated copolymerizable modifier monomer;
  wherein the amounts of (i) and (ii) are selected such that the total amount of (i) plus (ii) equals 100 parts by weight of the acrylic monomer; and
 (b) correspondingly from about 95 parts to about 5 parts of a silicone pressure-sensitive adhesive wherein the amounts of (a) and (b) are selected such that the total amount of (a) plus (b) equals 100 parts by weight;
 (c) about 0 part to about 5 parts by weight of photoinitiator based upon 100 parts by weight of the acrylic monomer; and
 (d) about 0 to about 5 parts by weight of a crosslinker based upon 100 parts by weight of (a) plus (b).

Preferably, the adhesive composition comprises about 0.01 to about 5 parts by weight of photoinitiator based upon 100 parts by weight acrylic monomer.

Preferably, the adhesive composition comprises about 0.01 to about 5 parts by weight of crosslinker based upon 100 parts by weight acrylic monomer.

The silicone pressure-sensitive adhesive preferably comprises the intercondensation product of a silanol functional polydiorganosiloxane and a silanol functional copolymeric silicone resin.

The pressure-sensitive adhesive composition of the invention is a solventless system (i.e., containing preferably no organic or inorganic solvents, at most less than about 1 weight percent of solvent based upon the total weight of the pressure-sensitive adhesive composition).

Preferably, the adhesive composition consists essentially of acrylic monomer, silicone pressure-sensitive adhesive, optional photoinitiator and optional crosslinker.

The invention also provides pressure-sensitive adhesive tapes comprising the adhesive of the invention coated on a backing or substrate, or as a transfer tape.

One preferred embodiment provides pressure-sensitive adhesive tapes exhibiting both improved adhesion to automotive paints and resistance to detaching at low temperature without loss of other critical properties.

Preferred pressure-sensitive adhesive tapes of the invention for adherence to paint comprise the pressure-sensitive adhesive of the invention coated on a substrate. In a highly preferred embodiment, the substrate comprises a foam layer comprising an ultraviolet-radiation polymerized acrylic copolymer of monomers comprising from about 80 parts to about 99 parts by weight of alkyl acrylate monomer, the alkyl groups of which have an average of 4 to 12 carbon atoms, and correspondingly, from about 20 parts to about 1 part by weight of monoethylenically unsaturated polar copolymerizable monomer; wherein the total amount of alkyl acrylate monomer plus polar copolymerizable monomer incorporated into the copolymer equals 100 parts by weight.

Another preferred embodiment provides pressure-sensitive adhesive tapes which are useful in medical applications in that they adhere to skin but do not exhibit excessive adhesion build over time which would result in a difficult, and thus painful, removal.

DETAILED DESCRIPTION OF THE INVENTION

The present invention relates to an ultraviolet radiation polymerizable pressure-sensitive adhesive composition comprising from about 5 to about 95 parts by weight of acrylic monomer and correspondingly from about 95 to about 5 parts by weight of silicone pressure-sensitive adhesive (PSA). Preferably, the adhesive composition comprises from about 10 to about 90 parts acrylic monomer and from about 90 to about 10 parts silicone PSA for ease of handling. More preferably, the adhesive composition comprises from about 20 to about 80 parts acrylic monomer and from about 80 to about 20 parts silicone PSA for even greater ease of handling most preferably, the adhesive composition comprises from about 30 to about 70 parts acrylic monomer and from about 70 to about 30 parts silicone PSA for the greatest ease of handling. The adhesive of the invention has a good balance of adhesive properties including good tack, good adhesion build, and good peel adhesion. The adhesive adheres well to a variety of different surfaces over a broad range of temperatures and therefor has a broad range of utility for a broad range of applications.

For adhesion to the newer automotive paints, the adhesive composition comprises from about 25 to about 75 parts acrylic monomer and from about 75 to about 25 parts silicone PSA for good peel adhesion, preferably from about 40 to about 60 parts acrylic monomer and from about 60 to about 40 parts silicone PSA for good peel adhesion and good resistance to detachment of the molding from the painted surface at low temperatures, and most preferably from about 55 to about 45 parts acrylic monomer and from about 45 to about 55 parts silicone PSA for superior peel adhesion and superior performance at low temperatures.

For medical applications, the adhesive composition comprises from about 25 to about 75 parts acrylic monomer and from about 75 to about 25 parts silicone PSA for providing good adhesion while limiting excessive adhesion build, preferably about 40 to about 60 parts acrylic monomer and about 60 to about 40 parts silicone PSA for reasons of providing good adhesion while limiting even more excessive adhesion build.

The acrylic monomers useful in the invention comprise from about 50 to about 100 parts alkyl acrylate monomer and from about 50 to about 0 parts of monoethylenically unsaturated copolymerizable modifier monomer for a good balance of adhesive properties (i.e. typically about 0.1 to about 50 parts of modifier monomer is used, typically about 2 to about 30 parts modifier monomer if polar monomer is used, about 5 to about 50 parts modifier monomer if non-polar monomer is used); preferably from about 60 to about 95 parts alkyl acrylate monomer and from about 40 to about 5 parts modifier monomer for superior balance of adhesive properties (i.e. typically about 5 to about 20 parts modifier monomer if polar monomer is used, about 5 to about 40 parts modifier monomer if non-polar monomer is used); and most preferably from about 80 to about 95 parts alkyl acrylate monomer and from about 20 to about 5 parts modifier monomer for the best balance of adhesive properties.

The ranges listed for polar modifier monomer and non-polar modifier monomer are approximate and can vary depending upon the particular monomer selected.

For some applications, the level of the polar modifier monomer in the adhesive composition is critical to the properties of the resultant adhesive. In the case of adhesives useful in adhering to painted surfaces, if the level of the polar modifier monomer is too low, the peel adhesion of the adhesive to the painted surfaces is significantly reduced. If the level of the polar modifier monomer is too high, the adhesive exhibits loss of tack and reduced peel adhesion.

For paint applications, the acrylic monomers useful in the invention comprise from about 60 to about 98 parts alkyl acrylate monomer and about 40 to about 2 parts of copolymerizable modifier monomer, preferably polar modifier monomer for reasons of providing good peel adhesion to paint; preferably about 70 to about 95 parts alkyl acrylate monomer and about 30 to about 5 parts polar modifier monomer for providing adhesion build to paint; and most preferably about 75 to about 85 parts alkyl acrylate monomer and about 25 to about 15 parts polar modifier monomer for providing the best adhesion build to the paint as well as good resistance to detachment at low temperatures.

For medical applications, the acrylic monomer comprises from about 50 to about 100 parts alkyl acrylate monomer and about 50 to about 0 parts modifier monomer for reasons of providing adequate adhesion to skin while limiting excessive adhesion build to skin (i.e. typically about 2 to about 20 parts polar modifier monomer if polar modifier monomer is used, about 0 to about 50 parts non-polar modifier monomer if non-polar modifier monomer is used); preferably about 70 to about 100 parts alkyl acrylate monomer and about 30 to about 0 parts modifier monomer for reasons of providing good adhesion to skin while limiting even more excessive adhesion build to skin (i.e. typically about 2 to about about 15 parts polar modifier monomer if polar modifier monomer is used, about 0 to about 30 parts non-polar modifier monomer if non-polar modifier monomer is used); and most preferably about 80 to about 100 parts alkyl acrylate monomer and about 20 to about 0 parts modifier monomer (i.e. typically about 10 to about 2 parts polar monomer if polar modifier monomer is used, about 0 to about 20 parts non-polar monomer if non-polar modifier monomer is used) for reasons of providing good adhesion to skin while limiting to the greatest extent excessive adhesion build to skin.

The alkyl acrylate monomer useful in the adhesive composition of the present invention is preferably a monofunctional unsaturated acrylate ester(s) of a nontertiary alkyl alcohol, the molecules of which have from about 4 to about 14 carbon atoms. Such monomers include those selected from the group consisting of isooctyl acrylate, 2-ethyl hexyl acrylate, isononyl acrylate, decyl acrylate, dodecyl acrylate, butyl acrylate, hexyl acrylate, mixtures thereof, and the like. Preferred alkyl acrylate monomers comprise isooctyl acrylate, 2-ethylhexyl acrylate, isononyl acrylate, butyl acrylate, and mixtures thereof, for reasons of commercial availability and providing good PSA properties. The alkyl acrylate monomers can be copolymerized with at least one copolymerizable modifier monomer.

The term "monoethylenically unsaturated copolymerizable modifier monomer", also referred to herein as the "modifier monomer" refers to a monomer that is capable of increasing the Tg (glass transition temperature) of a copolymer formed from the acrylic monomer, i.e., the alkyl acrylate and the modifier monomer, so that the Tg of the copolymer would be higher than that of a homopolymer of the alkyl acrylate by itself. The modifier monomer is selected from monoethylenically unsaturated copolymerizable monomers wherein the homopolymer of the modifier monomer has a higher Tg than the homopolymer of the alkyl acrylate. For example, the Tg of a homopolymer of 2-ethylhexyl acrylate is $-500°$ C. Examples of suitable comonomers are acrylic acid (homopolymer Tg of 106° C.) and isobornyl acrylate (homopolymer Tg of 940° C). The modifier monomer can comprise polar monomer, non-polar monomer, or mixtures thereof. Useful polar monomers include acrylamides, substituted acrylamides, acrylic acid, N-vinyl caprolactam, hydroxyalkyl acrylates such as 2-hydroxy ethyl acrylate; N-vinylpyrrolidone, N,N-dimethylacrylamide, acrylonitrile, methacrylic acid, itaconic acid, mixtures thereof, and the like. Preferred, polar monomers comprise acrylic acid acrylamide, N-vinyl-2-pyrrolidone, N-vinyl caprolactam, 2-hydroxyethylacrylate, and mixtures thereof for reasons of providing good adhesion properties including good adhesion build. Non-polar monomers that are useful, include cyclohexyl acrylate, trimethylcyclohexyl acrylate, dicyclohexadienyl acrylate, isobornyl acrylate, methylacrylate, ethyl acrylate, derivatives thereof, mixtures thereof, and the like.

The amount of modifier monomer that is useful depends upon the particular modifier monomer, alkyl acrylate, and silicone PSA in the composition. The components of the composition, i.e., the modifier monomer, the alkyl acrylate monomer, and the silicone PSA, are selected such that when the silicone PSA has been dispersed into the monomers to form a homogenous mixture, the components will not exhibit phase separation when left at room temperature, i.e., about 23° C., over a period of 12 hours, as visible to the naked eye. Phase separation, which is believed to be caused by incompatibility of the components, can appear as a distinct layer wherein the monomers exist as layers or as a small pool in the silicone PSA, depending upon the concentration and particular type of modifier momomer, alkyl acrylate, and monomers to silicone PSA in the composition. Phase separation can also be noted as extreme clouding of the PSA composition wherein the PSA could appear as curd-like particles in the monomer. There are variations of the phenomena described above as phase separation, but one skilled in the art would readily recognize phase separation by visual inspection.

The listed alkyl acrylate and modifier monomers are useful for all applications.

For paint applications, monomers which provide particularly good properties in addition to being commercially available are alkyl acrylate monomers selected from the group consisting of 2-ethyl hexyl acrylate, isooctyl acrylate, butyl acrylate and mixtures thereof, and the modifier monomer acrylic acid.

For medical applications, monomers which provide particularly good properties in addition to being commercially available are modifier monomers selected from the group consisting of 2-ethyl hexyl acrylate, isooctyl acrylate, and mixtures thereof, and modifier monomer selected from the group consisting of acrylic acid, isobornyl acrylate, and mixtures thereof.

Silicone pressure-sensitive adhesives employed in the adhesive composition of the invention, are well known in the art. Silicone PSAs are, in general terms, blends of (i) polydiorganosiloxanes (also referred to as "silicone gums" typically having a number average molecular weight of about 5000 to about 10,000,000 preferably about 50,000 to about 1,000,000) with (ii) copolymeric silicone resins (also referred to as an "MQ resin" typically having a number average molecular weight of about 100 to about 1,000,000, preferably about 500 to about 50,000 number average molecular weight) comprising triorganosiloxy units and $SiO_{4/2}$ units. It is beneficial, in terms of improving PSA properties, to provide a chemical means of reacting the copolymeric silicone resin with the polydiorganosiloxane. To achieve such a reaction, two different reaction chemistries have been commonly used; condensation chemistry and addition-cure chemistry.

Silicone PSAs based on condensation chemistry can be prepared by admixing silanol functional copolymeric resins comprising triorganosiloxy units and $SiO_{4/2}$ units with silanol-endblocked polydiorganosiloxanes as shown in U.S. Pat. Nos. 2,736,721; 2,814,601; 4,309,520; 2,857,356; 3,528,940; and Great Britain Patent No. 998,232, all incorporated by reference herein. Such blends, which are usually a solvent solution of copolymeric silicone resin and polydiorganosiloxane, as used in the art, are generally applied to a backing, heated to remove solvent, and crosslinked, if necessary, to improve the physical properties of the PSA. It is taught in these references that improvements in PSA properties are realized when the copolymeric silicone resin and the polydiorganosiloxane are intercondensed, providing intra- and inter-condensation within the adhesive. According to these references the condensation between the copolymeric silicone resin and the polydiorganosiloxane can be effected either in the presence of catalyst at ambient or elevated temperature, or in the absence of catalyst at elevated temperatures, as well as prior to application of the PSA to a backing, or subsequent to application of the PSA to a backing. Effective catalysts for promoting the silanol condensation reaction include organometallic compounds and metal salts of carboxylic acids as taught in U.S. Pat. No. 2,736,721, and amines as taught in Canadian Patent No. 575,664, both incorporated by reference herein. An additional method of intercondensing silicone resins and polydiorganosiloxanes is through the addition of orthosilicates, as taught in U.S. Pat. No. 4,831,070, incorporated by reference herein, and polysilicates.

A silicone PSA comprising the intercondensation product of a silanol functional polydiorganosiloxane and a silanol functional copolymeric silicone resin, as discussed above, can optionally include a free radical polymerization catalyst, such as a diaryl peroxide crosslinker, to crosslink the adhesive composition, thereby improving the high temperature shear properties of the PSA with only a slight loss in peel adhesion as taught in *The Handbook of Pressure-Sensitive Adhesive Technology*, (Satas, 1982), incorporated by reference in its entirety herein, p 348. When a peroxide crosslinker is present in the solution of silicone PSA, the PSA is generally applied to a backing, heated moderately to volatilize the solvent and the dried PSA heated further to temperatures in the range of 1500° C. to about 250° C. to activate the crosslinker as shown in U.S. Pat. No. 4,039,707, incorporated by reference herein. In applications where adhesive performance at elevated temperature is not required, the crosslinking agent may be omitted.

The polydiorganosiloxanes used in the preparation of the silicone PSA component of the instant invention can include any of the common structures and accompanying functionalities recited in the above references, which encompass polymers selected from the group consisting of polydimethylsiloxane polymers and poly(dimethylsiloxane/diphenylsiloxane) copolymers. Preferably, for automotive applications, polydimethylsiloxane is used in the preparation of the silicone PSA component for superior adhesion.

The copolymeric silicone resins useful in the preparation of the silicone PSA component of the present invention include any of the common structures recited in the above references which include copolymeric silicone resins having one or more of the following functionalities: silicon-bonded hydrogen, silicon-bonded alkenyl, and silanol other useful silicone resins include three component terpolymers comprising $R_3SiO_{1/2}$, $SiO_{4/2}$, and $R_2SiO_{2/2}$ structural units, (MQD resins)

wherein R is selected from the group consisting of alkyl radicals comprising 1 to 3 carbon atoms and phenyl radical, and wherein the ratio of $R_3SiO_{\frac{1}{2}}$ units to $SiO_2$ is between about 0.6 and about 0.9 inclusive as taught in U.S. Pat. No. 2,736,721, incorporated by reference herein, and those taught in Kokai HEI 2-36234, incorporated by reference herein, which comprise $R_3SiO_{\frac{1}{2}}$, $SiO_{4/2}$, and $RSiO_{3/2}$ structural units (MQT resins).

Many modifications of silicone PSAs have been suggested in the literature. Such modifications include simplifying or improving methods of preparation, improving shelf life by stabilizing PSA solution viscosity over time, and improving the balance of adhesive properties (tack, peel, and shear) possessed by such PSAS. Preparation method improvements are taught in U.S. Pat. No. 4,943,620, incorporated by reference herein, where ammonia water is used in place of conventional caustic catalysts to effect the condensation reaction between the polydiorganosiloxane and resin, thereby providing an adhesive of consistent quality having greatly improved stability against viscosity changes. Additional methods of improving the viscosity stability of silicone PSAs include addition of isopropanol, as taught in U.S. Pat. No. 4,309,520, incorporated by reference herein, as well as process modifications in combination with triorganosiloxy endblocking radicals, as taught in U.S. Pat. Nos. 4,584,355; 4,585,836; and 4,584,394; all incorporated by reference herein, which provide silicone PSAs having improved viscosity stability, film physical property stability upon aging, and lap shear stability.

Silicone PSAs prepared according to any of the aforementioned references are suitabl-P for use in the instant invention, however, it is preferred that silicone PSAs used in the instant invention be intercondensed prior to their introduction into the acrylic monomer component.

Silicone PSAs prepared by addition-cure chemistry generally comprise polydiorganosiloxanes having alkenyl groups, copolymeric silicone resins comprising $SiO_{4/2}$ and $R_3SiO_{\frac{1}{2}}$ structural units wherein R is as defined previously having one or more of the following functionalities: silicone-bonded hydrogen, silicone bonded alkenyl groups such as those selected from the group consisting of vinyl, allyl, and propenyl; or silanol, optionally a crosslinking or chain extending agent, and Pt or other noble metal hydrosilation catalyst to effect the curing of the silicone PSA. Examples of such compositions are found in U.S. Pat. Nos. 3,527,842; 3,983,298; 4,774,297; European Patent Publication Nos. 355,991, and 393,426, and Kokai HEI 2-58587, all incorporated by reference herein. Reported advantages of addition-cured silicone PSAs include reduced viscosity as compared to silicone PSAs prepared via condensation chemistry, higher solids content, stable viscosity with respect to time, and lower temperature cure.

of this class of silicone PSAs the compositions of Kokai HEI 2-58587, are particularly well-suited for use in the instant invention. These silicone PSA compositions are completely soluble in organic solvents, are easily prepared, and after removal of the solvent, readily dissolve in the acrylic monomer component of the instant invention. The other addition-cure silicone PSAs discussed in the above references would also be suitable for use as the silicone PSA component of the instant invention, given the limitation that after curing such silicone PSA, the PSA must readily dissolve in the acrylic monomer component of the present invention. Obtaining solubility of the silicone PSA in the acrylic monomer requires that crosslinking be minimized by reducing the amount of crosslinker present in the PSA to a level where only minimal, if any, gel content is present.

A wide range of commercially available silicone PSAs are well suited for use as the silicone PSA component of the present invention. Examples of such silicone PSAs include but are not limited to Dow Corning's 280A, 282, Q2-7406, and Q2-7566; General Electric's PSA 590, PSA 600, PSA 595, PSA 610, PSA 518 (medium phenyl content), PSA 6574 (high phenyl content), and PSA 529; Shin-Etsuls KR-100P, KR-100, KR-101-10, and X-40-820, and Rhone-Poulencls Rhodorsil 353, 354, 356, and 395 (dimethyl/diphenyl gum). Also useful as the silicone PSA component in the present invention are various blends of silicone PSAS, such as blends of two different dimethylsiloxane-based PSAS, as taught in *The Handbook of Pressure-Sensitive Adhesive Technology* (Satas, 1982), p. 346, incorporated by reference herein, or blends of dimethylsiloxane-based PSAs with dimethylsiloxane/diphenylsiloxane-based PSAs as shown in U.S. Pat. No. 4,925,671, incorporated by reference herein.

The adhesive composition of the invention comprises acrylic monomer(s), a silicone PSA, optional photoinitiator, and optional crosslinker. The photoinitiator when irradiated with ultraviolet (UV) radiation initiates polymerization of the acrylic monomers. Photoinitiators which are useful include the benzoin ethers such as benzoin methyl ether or benzoin isopropyl ether, substituted benzoin ethers such as anisoin methyl ether, substituted acetophenones such as 2,2-diethoxyacetophenone and 2,2-dimethoxy-2-phenylacetophenone, substituted alpha-ketols such as 2-methyl-2-hydroxypropiophenone, aromatic sulfonyl chlorides such as 2-naphthalene sulfonyl chloride, and photoactive oximes such as 1-phenyl-1,2-propanedione-2-(O-ethoxycarbonyl)-oxime. The photoinitiator if used is typically present in an amount of about 0.01 to about 5 parts, preferably about 0.01 to about 2 parts, per one hundred parts of acrylic monomer (i.e., alkyl acrylate monomer plus copolymerizable modifier comonomer). We theorize that after polymerization, initiator by-products may be present in the PSA as well as some unreacted photoinitiator depending on the total initiator amount used.

The adhesive composition of the invention may also contain a crosslinking agent, preferably a photoactive crosslinking agent, most preferably a UV photoactive crosslinking agent. The photoinitiator can also be the crosslinking agent. The terms "crosslinking agent" and "crosslinker" are used interchangeably herein. Various types of crosslinking agents are useful in the practice of the invention. The cured adhesive composition of the present invention has at least a first phase and a second phase. The first phase consists primarily of the silicone PSA and the second phase consists primarily of acrylic copolymer. The acrylic phase or silicone phase or both the acrylic phase and silicone phase may be continuous. Certain crosslinkers are capable of crosslinking within the acrylic phase (useful when the acrylic phase is continuous). Certain crosslinkers are capable of crosslinking within the silicone phase (useful when the silicone phase is continuous). other crosslinkers are capable of crosslinking within each individual phase as well as between the two phases (useful when either or both phases are continuous). Preferably, the crosslinker is selected from the group consisting of multifunctional acrylates, triazines, silane coupling agents, benzophenones, and mixtures and derivatives thereof.

One type of crosslinker is a multi-functional acrylate such as 1,6-hexanediol diacrylate as well as those disclosed in U.S. Pat. No. 4,379,201 (Heilmann, et al.), incorporated herein by reference, (such as trimethylolpropane triacrylate, pentaerythritol tetracrylate, 1,2-ethylene glycol diacrylate, etc.) These crosslinkers are useful in crosslinking the acrylic phase to improve the internal strength of the acrylic phase when the acrylic phase is continuous.

The substituted triazines, discussed above include those disclosed in U.S. Pat. Nos. 4,329,384 and 4,330,590 (Vesley), both incorporated herein by reference, e.g., 2,4-bis(trichloromethyl)-6-p-methoxystyrene-s-triazine. We theorize that the triazines crosslink within each individual phase as well as between the two phases. As discussed above silane coupling agents are also useful in crosslinking. Useful silane coupling agents are epoxy type crosslinkers such as gamma-glycidoxypropyl trimethoxysilane, methacryl type such as gamma-methacryloxypropyltrimethoxysilane, and mercapto type such as gamma-mercaptopropyltrimethoxy silane. As discussed above benzophenone crosslinkers can also be used in the practice of the invention. Crosslinkers are preferably used for applications in which a high shear strength is desired. When used, the crosslinking agent is typically present in an amount of from about 0.01 to about 5 parts by weight per one hundred parts total of acrylic monomer plus silicone PSA.

The adhesive of the invention is typically prepared by the following method. A silicone pressure-sensitive adhesive composition is stripped of its solvent to remove substantially all of the organic solvent in the PSA composition. The solvent can be stripped off and recovered by methods known in the industry. The resulting silicone PSA is dispersed or dissolved in alkyl acrylate monomer and copolymerizable modifier monomer, following which photoinitiator is added to form the pressure-sensitive adhesive composition of the invention. The silicone PSA can also be dispersed or dissolved first in the acrylate monomer before adding the copolymerizable modifier monomer, etc. Optional crosslinking agents or other additives such as antioxidants and fillers may also be incorporated into the adhesive composition. The adhesive composition can then be coated onto a suitable substrate and exposed to ultraviolet radiation to obtain a pressure-sensitive adhesive.

The viscosity of the adhesive composition can be adjusted, by modifying the adhesive composition, to obtain a viscosity appropriate for the coating method to be used. For good coatability, the adhesive composition of the invention typically has a viscosity of about 500 to about 40,000 cps. Conventional coating methods such as knife coating and roll coating can be used. At higher viscosities (i.e. above about 40,000 cps) the adhesive composition can be extruded or die coated.

The adhesive composition of the invention can be coated onto a flexible carrier web and polymerized in an inert, i.e. a substantially oxygen-free atmosphere or a nitrogen atmosphere. A sufficiently inert atmosphere can be achieved by covering a layer of the photoactive coating with a plastic film which is substantially transparent to ultraviolet radiation, and irradiating through that film in air using fluorescent-type ultraviolet lamps. If, instead of covering the polymerizable coating, the photopolymerization is to be carried out in an inert atmosphere, the permissible oxygen content of the inert atmosphere can be increased by mixing into the polymerizable monomer an oxidizable tin compound as taught in U.S. Pat. No. 4,303,485 (Levens), incorporated herein by reference, which also teaches that such procedures will allow thick coatings to be polymerized in air.

The adhesive composition of the invention is typically cured and applied by first making a tape construction which comprises a layer of adhesive composition evenly coated between two liners at least one of which is coated with a release material. A transfer tape can be made by coating the adhesive composition between two liners both of which are coated with a release coating. The release liners typically comprise a clear polymeric material such as polyester that is transparent to ultraviolet radiation. Preferably, each release liner is first coated or primed with a release material which is incompatible with the silicone containing adhesive of the invention. For example, silicone release liners can be used for adhesive compositions containing high amounts of acrylic monomer compared to silicone PSA, e.g., 90 parts acrylic monomer, 10 parts silicone PSA. Adhesive compositions with higher concentrations of silicone PSA can be coated onto release liners coated with other release compositions such as those comprising polyfluoropolyether or fluorosilicone. Adhesive compositions containing phenyl silicone PSAs can be coated onto liners coated with a methyl silicone release composition.

The release liners useful in the practice of this invention are those that are suitable for use with silicone pressure-sensitive adhesives and organic pressure-sensitive adhesives. An example of a useful composition is the polyfluoropolyether disclosed in copending U.S. application Ser. No. 07/450,623 assigned to the assignee of the present application, incorporated by reference herein. Other useful release coating compositions that can be used to make a suitable release liner are described in European Patent Publication No. 378420, U.S. Pat. No. 4,889,753; and European Patent Publication No. 311262, all incorporated by reference herein. Release liners and compositions are also commercially available. Useful commercially available release coatings include Dow Corning ® Syl-off TM 0 7610 polydimethylsiloxane release coating, and Q2-7785 fluorosilicone release coating; Shin-Etsu X-70-029NS fluorosilicone release coatings; and the like.

The adhesive compositions of the invention can also be coated onto a differential release liner, i.e. a release liner having a first release coating coated on one side of the liner and a second release coating coated on the opposite side of the liner. The two release coatings should have different release values. For example, one release coating may have a release value of 5 grams/cm, i.e. 5 grams of force is needed to remove a strip of adhesive 1 cm wide from the coating, and the second release coating may have a release value of 15 grams/cm. The adhesive is typically coated onto the side of the release liner coated with the release coating having the higher release value and the resulting tape can be wound into a roll. As the tape is unwound, the adhesive remains adhered to the release coating with the higher release value. After the tape is applied to a substrate, the release liner can be removed to expose an adhesive surface for further use.

The adhesive composition is cured by exposure to ultraviolet radiation which is transmitted through the release liner(s). When a transfer tape is made, one of the liners of the transfer tape can be removed and the exposed adhesive surface can be laminated to another substrate such as a backing. The remaining release liner aids in transferring the adhesive to the substrate. The substrate can be any of the typical substrates used for tapes such as those selected from the group consisting of polymeric films (e.g. polyester, polypropylene, polyurethane) metal foils, glass cloth, paper, cloth, nonwoven materials, foam sheets, and the like. Foam sheets are known in the industry and include open and closed cell foams made from polyethylene, polyurethane, acrylates, polystyrene, neoprene, silicone, and the like.

The adhesives of the invention adhere well to polyester, polycarbonate, polyolefins such as polyethylene, and polypropylene which are known to be difficult materials to adhere to.

Photopolymerization of the adhesive compositions of the invention by exposure to ultraviolet radiation yields phase-separated pressure-sensitive adhesives. The cured adhesive composition of the present invention has at least a first phase and a second phase. The first phase consists primarily of the silicone PSA and the second phase consists primarily of acrylic copolymer. Factors influencing the morphology i.e., which phase of the cured adhesive composition is continuous and which phase is discontinuous, include the ratio of acrylic monomer to silicone PSA, the particular polar copolymerizable monomer used, and the ratio of alkyl acrylate monomer to polar copolymerizable monomer used.

For example, adhesive compositions containing lower concentrations of silicone PSA; i.e., having a higher ratio of acrylic monomer to silicone PSA, favor the formation of a continuous acrylic phase having a silicone phase dispersed therein. Conversely, adhesive compositions containing higher concentrations of silicone PSA favor the formation of a continuous silicone phase having an acrylic phase dispersed therein. The concentration and polarity of the components of this system can be varied widely to obtain the PSA properties desired for a particular application. Either phase can be continuous, with the other phase being discontinuous, depending upon the particular adhesive composition. Alternatively, both phases can be continuous.

In one preferred embodiment, for adhesion to automotive paints, the silicone phase is the continuous phase and the acrylic phase exists as relatively uniform inclusions ranging in size from about 0.1 micrometer to about 1 micrometer when examined by transmission electron microscopy (TEM). A pressure-sensitive adhesive tape having such an adhesive layer provides substantial improvement in adhesion and adhesion build to auto body paint surfaces in addition to substantial improvement in low temperature performance.

Certain of the pressure-sensitive adhesive tapes of the invention exhibit significantly improved adhesion to the newer automotive paints. Such paints are designed to reduce pollution, and retain durable high gloss finishes. Conventional adhesives have greatly reduced adhesion to such paints as compared to older paint formulations. Some examples of these newer types of automotive paint include BASF/Inmont paints "E-14" and "E-176", DuPont paints "m33J-100" and "RK-3840", and "50-J", and Asahi Chemical Co. Ltd. paint "Lumiflon".

Certain preferred pressure-sensitive adhesive tapes of the invention also exhibit improved low temperature detachment when subjected to an automotive industry test referred to as the "cold slam" test at temperatures of between −30° C. and −45° C.

Without wishing to be bound by theory, it is believed that these certain pressure-sensitive adhesive tapes exhibit improvements in paint adhesion and resistance to detaching at low temperatures because of the unique morphology of the continuous silicone phase and the excellent chemical interaction of the acrylic copolymers with painted substrates.

In a specific embodiment for a tape construction adherable to automotive paints, one release liner of a transfer tape is typically removed and the exposed adhesive layer is firmly contacted and adhered to a foam layer material such as those discussed above. Useful foam layer materials typically have thicknesses of about 0.3 mm to about 4 mm. The thickness of the foam layer can vary, depending upon the intended application. Foam layers are especially useful to prevent low temperature detachment. The opposite side of the foam layer is typically coated with a conventional pressure-sensitive adhesive that adheres well to an auto body side molding, etc. Such adhesives are disclosed in Re 24,901, incorporated by reference herein. The remaining release liner which carries the adhesive of the invention can be removed for application of the adhesive coated foam layer, having a body side molding, etc. firmly adhered to its opposite side, to a painted car door, etc.

In one embodiment of tape constructions adherable to paint, the foam layer comprises an ultraviolet-radiation polymerized acrylic copolymer which may incorporate similar or dissimilar acrylic monomers in like or unlike thicknesses, having similar or different additives from those acrylic copolymers contained in the adhesive layer comprising the adhesive of the invention. The foam layer comprises about 80 parts to about 99 parts of an alkyl acrylate monomer, and correspondingly, about 20 parts to about 1 part of a copolymerizable modifier monomer, based upon 100 parts by weight of acrylic monomer, i.e. alkyl acrylate monomer plus modifier monomer. The foam layer may further include a gas and/or microspheres. The microspheres may be glass or polymeric. The microspheres preferably have an average diameter of about 10 to about 200 micrometers and comprise about 5 to about 65 volume percent of the foam layer. The gas can be an inert gas, such as nitrogen, that is mixed into the monomers to form a froth prior to polymerization. Other useful materials that can be blended into the foam layer composition include, but are not limited to fillers, such as silicas, hydrophobic silicas, pigments, foaming agents, antioxidants, and viscosity adjusting agents.

The adhesives of the invention also show utility as an adhesive for wound dressings and tapes used on mammalian skin. Adhesives for wound dressings must be non-irritating to the skin. It is also desirable to have a fairly low adhesion initially so that the dressing can be re-positioned, but should not have excessive adhesion build over time. An adhesive that has too high of an adhesion to skin can be difficult and painful to remove.

The adhesive can be coated onto any backing suitable for dressings. In general, the backings should be flexible to conform well to the skin, and breathable, i.e. be permeable enough to have adequate moisture vapor transmission to prevent moisture build-up under the dressing but impermeable to bacteria and other contaminants. Backings are typically made of nonwoven materials, cloth, polymeric films, and the like. The backing can be made from a variety of materials including rayon, polyesters, polyolefins such as polyethylene, cotton, and polyurethanes. Suitable backings include those disclosed in Copeland, U.S. Pat. No. 3,121,021, incorporated by reference herein, and Heineke, U.S. Pat. No. 4,917,929, incorporated by reference herein, both assigned to the assignee of the present application. For certain applications, such as for a dressing over an intravenous needle, it is desirable that the backing material be substantially transparent so that the position of the needle can be monitored. Polyurethane films are particularly well suited for this application, due to their transparency as well as their breathability.

In the case of preparing a construction adherable to skin, one release liner is typically removed and the adhesive layer is firmly contacted and adhered to a suitable backing. The adhesive composition can also be coated onto the backing and cured if the backing is transmissive to ultraviolet light.

In addition to general multipurpose applications and specific paint and medical applications, the adhesives of the invention have other additional advantages. In some cases, when an adhesive is coated onto a substrate and covered with a silicone release liner, it is desirable for the adhesive to remain releasably adhered to the liner until it is used. However, conventional acrylate adhesives release easily from silicone coated liners and may pop off prematurely to expose the adhesive to contamination and dust. The adhesives of the invention can exhibit improved adhesion to the liner so that the liner remains adhered until the adhesive is used. The adhesive composition of the invention can be varied, i.e. by adjusting the amount of silicone PSA in the adhesive composition to control the adhesion of the resultant adhesive to the release liner. This is important in situations where an adhesive coated sheet is die-cut and it is desired that the liner remain adhered to the adhesive or when adhesive coated substrates are exposed to low temperatures as can occur in storage or in shipment and liner pop-off can occur.

Testing Procedures

The following tests have been used to evaluate adhesives of the invention. All percentages, parts and ratios within the specification, including the examples, and the claims are by weight unless specifically stated otherwise.

Analysis of Adhesive Morphology by Transmission Electron microscopy (TEM)

Thin sections (500–1000 Angstroms) for TEM testing were prepared at a sample temperature of −140° C. using a Reichert-Jung ™ Ultracut ET ™ cryoultramicrotome equipped with an FC4 cryoattachment. A Diatome ™ diamond knife with a stainless steel boat was employed. The sections were examined using a JEOL 100 CX electron microscope in transmission mode operated at 100 kV.

90° Peel Adhesion from Painted Substrate

A strip of anodized aluminum 19 mm×200 mm×0.125 mm is positioned on one adhesive face of the tape sample. Pressure is applied to the aluminum by rolling with a 2 kg roller. The opposite face of the sample is then firmly bonded to a rigid painted substrate. After the specified dwell time at room temperature, the sample is removed by pulling the aluminum strip at 90° to the adhesive surface at a speed of 30.5 cm/minute, noting the average adhesion in N/cm width, and the failure mode. Foam split (FS) is the most desirable failure mode as it indicates adhesion to the substrate is stronger than the internal strength of the foam layer.

Static Shear Test

A sample is prepared by cutting a 2.54 cm by 1.27 cm piece of foam that is coated on one side with the pressure-sensitive adhesive of the present invention and coated on the other side with a conventional acrylic pressure-sensitive adhesive, such as those disclosed in Re. 24,906 (Ulrich), incorporated by reference herein. A composite is then formed by sandwiching the sample between a 5 cm by 5 cm steel panel that has been painted with 50-J paint and a 1.4 cm by 5.0 cm by 0.8 mm smooth steel strip having a hole at one end such that the pressure-sensitive adhesive of the present invention is in contact with the paint and the conventional pressure-sensitive adhesive is in contact with the steel strip at the end opposite that having the hole. The contact area to be tested is 2.54 cm by 1.27 cm. The portion of the panel and the strip that are not in contact with the adhesive extend away from the sandwiched sample in opposite directions from each other. The composite is then rolled down with two passes of a 2 kg roller and aged for 1 hour at room temperature. The panel is then hung at 2 degrees from the vertical for 15 minutes in an air circulating oven which has been preheated to 70° C. A 500 gram weight is then hung from the hole in the steel strip and a timer is started. The time at which the weight falls is the "Static Shear Value" in minutes. If no failure occurs after 10,000 minutes, the test is discontinued.

Cold Slam

A rigid vertical steel frame approximately 40 cm square is provided at its upper edge with a similar dimensioned hinged frame/door. 19.4 square cm (2.54 cm×7.62 cm) of medium density silicone foam is mounted at the lower outer edge of the fixed vertical frame (where the hinged door impacts when slammed). Test panels are prepared as follows:

A 12.7 mm×125 mm pressure-sensitive attachment tape, carried on a release liner, is applied to the 15 mm×150 mm face of a rigid polyvinyl chloride test bar which is 6 mm thick. The tape is pressed into place by rolling once with a 6.8 kg roller. The liner is then removed from the tape, and the exposed surface having the pressure-sensitive adhesive of the invention is attached to a freshly painted steel panel (with 50-J paint) which is 100 mm×300 mm. Four test bars are attached, in two rows, in the lengthwise direction of the steel panel, with one end of each test bar extending beyond the end of the panel approximately 2.5 cm. After rolling the test panel with a 6.8 kg roller at a rate of 300 mm/min, the panel is allowed to dwell for 3 days at ambient temperature. The specimen is then conditioned at −40° C. for approximately 12 hours in the cold chamber, which houses the cold slam fixture as described above. The test panel is then secured in the fixture, with the test bars and the long dimension of the panel mounted in a horizontal direction.

The following test procedure was designed so that some quantitative estimate of cold slam performance could be obtained, rather than simply a pass-fail rating.

The cold slam test is conducted by raising the hinged "door" to a predetermined angle, and releasing it, allowing it to strike the frame and expose the test panel to a slam at cold temperatures. Ten slams are conducted at each of the five possible slam angles. The slam angle and the number of the slam (1-1.0) during which any of the four vinyl bars becomes delaminated or detached is recorded. A slam angle of 23 degrees is used initially. If there have been no failures after ten slams at this angle, the angle is increased to 45 degrees. This procedure is repeated until all test bars become detached, or until ten slams at the 180 degree slam angle have been conducted. If failure of one or more bars does occur at a specific stage during the initial ten slams, an additional 10 slams are conducted at that stage before advancing to the next slam angle. The results are recorded by documenting the door slam angle/stage and slam number in which delamination begins, or failure occurs. Numerical designation in the form of stages 1-5 correspond to door slam angles of 23, 45, 68, 90, and 180 degrees, respectively. Lower stage numbers indicate poor cold slam properties, e.g., 1 or 2. Higher stage numbers indicate excellent cold slam properties, e.g., 4 or 5. The stage, number of slams, at each stage number of failures, and the failure mode are recorded.

Skin Adhesion Procedure

The test procedure used is PSTC-1 which is Test Method No. 1 of the Pressure-Sensitive Adhesive Tape Council, Glenview, Ill., Seventh edition (1976), incorporated by reference herein, except that the test was modified so that the tape could be applied to the human skin surface on a selected area on the individual's back. Tape samples 2.54 cm wide by 5.08 cm long are placed on the back of an individual and rolled down with one forward and one reverse pass of a 1 kg roller (described in Appendix B, Sections 2.7.1, 2.8.1, and 2.8.2 of the above referenced specification) moved at a rate of 30 cm per minute. Adhesion to the skin is measured at a 180 degree angle according to PSTC-1 using a strain gauge mounted on a motor driven carriage. The force of removal is reported in grams of adhesion per 2.54 cm width of sample. The rate of removal is 15 cm per minute. Initial skin adhesion is measured immediately after applying the tape. Aged adhesion is measured after 24 hours of continuous skin contact. Acceptable skin adhesives will generally exhibit an initial adhesion value of between 20 grams to about 100 grams, and a 24 hour skin adhesion of about 75 grams to about 300 grams.

The following examples are to be considered as illustrative in nature, and are not limiting in any way. The scope of the invention is that which is defined in the claims only.

EXAMPLES

The following terminology, abbreviations, and trade names are used in the examples:

| | |
|---|---|
| IOA | isooctyl acrylate |
| AA | acrylic acid |
| IBnA | isobornyl acrylate |
| KB-1 | 2,2 dimethoxy-2-phenyl acetophenone photoinitiator available from Sartomer |
| RT | room temperature |
| POP | pop off panel, failure mode, no adhesive residue remaining on paint coated substrate |
| FS | foam split failure mode, adhesive continued to adhere to paint but foam core layer split (indicates good adhesion —i.e. adhesion is higher than core strength) |
| Sil | commercial silicone PSA |
| Ex | Example |
| Acryl | the acrylic polymer polymerized from the acrylic monomer (i.e., alkyl acrylate monomer plus modifier monomer) |
| PHR or phr | parts per hundred parts acrylic monomer (i.e. alkyl acrylate monomer plus modifier monomer) |
| WT % | weight percent |
| SI/ACRYLIC PSA | silicone/acrylic PSA |
| E-14 | a high solids clear topcoat enamel available from Inmont |
| 50-J | a medium solids enamel available from DuPont designated as 50-J by Ford |
| LDPE | low density polyethylene |
| ABS | acrylonitrile butadiene styrene |
| Epoxy | cured epoxy resin panel |
| TPO | thermoplastic polyolefin |
| wt | weight |
| min | minutes |
| hr or Hrs | hours |
| Init | initial |

Throughout the Examples, the rest of the Specification and the claims all parts, percentages, and ratios are by weight unless otherwise indicated.

EXAMPLE 1

200 grams of a 55% solids silicone pressure-sensitive adhesive (PSA) in xylene (Q2-7406 available from Dow Corning) were heated at 150° C. for about 6 hours to obtain a dried silicone pressure-sensitive adhesive that is substantially solvent-free. A mixture having 80 parts isooctyl acrylate (IOA), 20 parts of acrylic acid (AA) and 100 parts of the dried silicone adhesive was mixed until the silicone PSA was dissolved in the IOA/AA monomers. To this solution was added 0.2 part per hundred acrylic monomer (phr) 2,2-dimethoxy-2-phenyl acetophenone photoinitiator (KB-1 photoinitiator from Sartomer), and 0.15 phr of 2,4-bistrichloromethyl-6-(4-methoxyphenyl)-s-triazine as disclosed in U.S. Pat. No. 4,330,590 (Vesley), incorporated by reference herein. The solution was then mixed with an air driven high shear propeller mixer for about 5 minutes. The mixture was then degassed, and knife coated to a uniform thickness of 0.05 mm onto a 0.05 mm thick biaxially-oriented polyethylene terephthalate (PET) film, which had been coated with a release agent. A second PET film as described above was placed over the coated mixture with the release coated side facing the coating. The coating was polymerized to form a pressure-sensitive adhesive by exposure to a bank of ultraviolet fluorescent lamps, 90% of the emissions were between 300 and 400 nm with a maximum at 351 nm and which provide radiation intensity of approximately 1-2 mW/cm². Total exposure was about 400 mj/cm² (Dynachem units). The resulting pressure-sensitive adhesive had an alkyl acrylate/polar comonomer ratio (IOA/AA) of 80/20 and an acrylate/silicone ratio (acryl/sil) of 50/50 wherein the acrylate moiety includes both the alkyl acrylate and the polar comonomer.

The top liner was then removed. An acrylic foam-like layer was formed on top of the pressure-sensitive adhesive as will be described. A solution of 95 parts IOA, 5 parts AA, and 0.04 part KB-1 was placed in a one-liter mixing vessel equipped with a lid. The vessel was sparged with nitrogen for 30 minutes. The solution was then partially polymerized by exposure to UV lamps as described above to a viscosity of about 3000 cps. To the mixture was added an additional 0.10 part KB-1, 0.10 part 1,6-hexanediol diacrylate, 8 phr glass microbubbles (C15/250 having average diameters of 80 micrometers available from Minnesota mining & Manufacturing Co.), and 10 phr silica("Aerosil" 972 from DeGussa). The mixture was knife coated onto the pressure-sensitive adhesive at a thickness of about 1.0 mm. A release coated, 0.05 mm thick polyester film was placed over the mixture and the top mixture was polymerized with UV light with a total energy of 700 mJ/cm$^2$.

The resulting tape had a foam-like characteristic and was tested for cold slam, peel adhesion, and adhesion build as shown in Table 1.

EXAMPLE 2

A pressure-sensitive adhesive tape was made by knife coating the adhesive solution of Example 1 to a thickness of 0.05 mm as described in Example 1. The partially polymerized mixture for the foam-like layer of Example 1 was knife coated onto the wet pressure-sensitive adhesive at a thickness of 1 mm. A second release liner was placed over the mixture and the composite was cured with UV light at a total energy of 700 mJ/cm$^2$. The resulting tape was tested for peel adhesion and cold slam as shown in Table 1.

EXAMPLE 3

A pressure-sensitive adhesive tape was made by simultaneously coating the adhesive solution of Example 1 and the partially polymerized mixture of Example 1 using a coating die having two orifices onto a release coated polyester liner. The thickness of the adhesive layer was 0.05 mm and the foam-like layer was 1.0 mm thick. A second liner was placed over the mixture and the composite was cured with UV light at a total energy of 700 mJ/cm$^2$. The resulting tape was tested as in Example 1 and results are shown in Table 1.

EXAMPLE 4

The mixture for the foamlike layer of Example 1 was coated to a 1.0 mm thickness and cured between two release coated polyester liners with UV light at a total energy of 700 mJ/cm$^2$. The foamlike layer was primed and laminated to the polymerized pressure-sensitive adhesive of Example 1 to make a pressure-sensitive adhesive tape. The tape was tested as in Example 1 and results are shown in Table 1.

COMPARATIVE EXAMPLE C-1

To a one liter mixing vessel equipped with a lid was added 80 parts of IOA, 20 parts of AA, and 0.04 phr photoinitiator (KB-1). The resulting solution was sparged with nitrogen and partially polymerized under UV light to a viscosity of about 2000 cps. To the partially polymerized mixture was added an additional 0.16 phr KB-1 and 0.15 phr of the triazine described in Example 1. The partially polymerized mixture was knife coated to a thickness of 0.05 mm and cured to make an adhesive transfer tape as described in Example 1. The resulting tape was laminated to a foam-like layer, tested as in Example 1 and results are shown in Table 1.

TABLE 1

| Example | Peel Adhesion E-14 Paint-N/cm | | Cold Slam (−40° C.)* 3 Day RT Dwell |
|---|---|---|---|
| | 20 min. | 72 hr. | Stage,S/F/Fail Mode |
| 1 | 57.5 | 82.3 | 4,10-1/FS |
| | | | 17-1/FS |
| | | | 18-1/FS |
| | | | 5,1-1/FS |
| 2 | 30.2 | 37.4 | 5,4-1/FS |

TABLE 1-continued

| Example | Peel Adhesion E-14 Paint-N/cm | | Cold Slam (−40° C.)* 3 Day RT Dwell |
|---|---|---|---|
| | 20 min. | 72 hr. | Stage.S/F/Fail Mode |
| | | | 6-1/FS |
| | | | 10-1/FS |
| | | | no failure in last sample |
| 3 | 55.6 | 64.8 | 5,2-1/FS |
| | | | 4-1/FS |
| | | | 5-1/FS |
| | | | 10-1/FS |
| 4 | 60.0 | 102.0** | 5,2-1/FS |
| | | | 4-1/FS |
| | | | 5-1/FS |
| | | | 8-1/FS |
| C-1 | 1.0 | 3.6 | 2,1-1/POP |
| | | | 2-1/POP |
| | | | 4-2/POP/FS |

*Cold slam is shown by the stage, the number of slams, and the number of failures. The slams are done consecutively, and the failure mode is indicated. FS is foam split and POP is the adhesive pops off of the paint panel. For example, "4,10-1/FS" represents one sample failing by foam split on the 10th slam of the 4th stage. "17-1/FS" which falls under the 4th stage in category in Table 1 represents one sample failing by foam split on the 17th slam of the 4th stage.
**Failure was due to delamination of the foam layer and the PSA of the invention.

The data in Table 1 shows that the PSA of the present invention has superior peel adhesion to paint and superior cold slam properties when compared to a similarly made acrylate PSA without the silicone PSA. The examples show various methods of applying the PSA to a foam layer. The PSA of these examples is crosslinked.

The following examples illustrate the peel adhesions provided by the PSAs of the present invention compared to conventional acrylic and silicone PSAs.

EXAMPLES 5-19

Pressure-sensitive adhesives were made as in Example 1 except without the triazine, and the amounts of IOA, AA, and silicone adhesive were varied as shown in Table 2.

A foam-like layer was made by partially polymerizing a mixture of 87.5 parts IOA, 12.5 parts AA, and 0.04 part 2,2-dimethoxy-2-phenyl acetophenone (Irgacure TM 651 available from Ciba-Geigy Corporation) in a nitrogen atmosphere to a viscosity of about 1500 cps under UV lights. To the partially polymerized mixture was added an additional 0.1 part Irgacure TM 651, 0.05 part 1,6-hexandiol diacrylate, 4 parts hydrophobic silica, and 8 parts glass microbubbles having an average diameter of 50 microns and a density of 0.15 g/cm$^3$ (C15/250 available from Minnesota Mining and Manufacturing Co.). The mixture was then coated onto a release agent coated PET liner, covered with a second similar PET liner, and cured as described in Example 1. The resulting layer had a thickness of about 1.0 mm. The foam-like layer was then primed and the pressure-sensitive adhesive transfer tape was then laminated to the foam-like layer. The resulting tape construction was tested for peel adhesion and adhesion build with test results as shown in Table 2.

COMPARATIVE EXAMPLE C-2

A pressure-sensitive adhesive transfer tape was made as in Example C-1 and laminated to a foam-like layer as in Example 5. Test results are shown in Table 2.

COMPARATIVE EXAMPLE C-3

Dow Corning Q2-7406 was mixed with 2%, by weight of the silicone solids, dichlorobenzoyla peroxide catalyst. The adhesive was coated onto a Q2-7785 release liner (available from Dow Corning) to provide a dry coating thickness of 0.05 mm. The coated adhesive was cured in an oven for 1 minute at 70° C. and for 2 minutes at 168° C., and the resulting pressure-sensitive adhesive was laminated to the primed foam-like layer of Example 5. Test results for peel adhesion are shown in Table 2.

TABLE 2

| Example | Composition - parts by weight | | Peel Adhesion 50-J Paint-N/cm | | Peel Adhesion E-14 Paint-N/cm | |
|---|---|---|---|---|---|---|
| | IOA/AA Ratio | Acryl/Sil* Ratio | 20 min | 72 hr | 20 min | 72 hr |
| 5 | 80/20 | 50/50 | 30.0 | 62.2 | 18.5 | 48.5 |
| 6 | 95/5 | 70/30 | — | — | 9.5 | 13.6 |
| 7 | 95/5 | 60/40 | — | — | 10.5 | 15.8 |
| 8 | 92/8 | 60/40 | 16.5 | 26.3 | 11.1 | 15.7 |
| 9 | 90/10 | 50/50 | 20.5 | 32.7 | 15.1 | 16.6 |
| 10 | 90/10 | 60/40 | — | — | 13.1 | 23.0 |
| 11 | 86/14 | 70/30 | 18.1 | 62.9 | 14.3 | 23.1 |
| 12 | 85/15 | 70/30 | — | — | 11.7 | 40.2 |
| 13 | 85/15 | 60/40 | — | — | 27.3 | 38.5 |
| 14 | 85/15 | 50/50 | — | — | 24.3 | 31.1 |
| 15 | 83/17 | 60/40 | 21.7 | 62.6 | 22.4 | 30.1 |
| 16 | 80/20 | 70/30 | — | — | 8.6 | 13.7 |
| 17 | 80/20 | 60/40 | — | — | 19.3 | 28.3 |
| 18 | 80/20 | 40/60 | 21.6 | 37.5 | — | — |
| 19 | 70/30 | 50/50 | 15.8 | 18.5 | 10.9 | 8.9 |
| C-2 | 80/20 | | 4.8 | 10.1 | — | — |
| C-3 | DC7406 | | 12.5 | 16.9 | 14.5 | 18.5 |

*Ratios are defined in Example 1.

Table 2 shows the excellent adhesion build of PSAs of the invention on automotive paints as compared to conventional acrylic or silicone PSAs. As the ranges of IOA, AA, and silicone PSA approach the outer limits of the preferred formulations, the adhesion properties approach the performance of straight silicone PSAs. The performance varies with the specific type of paint.

The following examples illustrate the superior cold slam performance of the PSA of the present invention as compared to a conventional acrylic PSA.

EXAMPLES 20-26

A foamlike layer was made as disclosed in U.S. Pat. No. 4,415,615, incorporated herein by reference, using a mixture of 87.5 parts IOA, 12.5 parts AA, 0.04 part Irgacure TM 651, 2 parts of silica ("Aerosil" 972 from DeGussa Corp.) 8 parts of glass microbubbles having an average diameter of 50 microns and a density of 0.15 g/cm³, and surfactant D (the preparation of which is described in U.S. Pat. No. 4,415,615 incorporated by reference herein). The mixture was frothed to a void volume of 0.6 g/cm³. The foam layer was primed. Pressure-sensitive adhesive transfer tapes were made as in Example 1, without the triazine, with varying amounts of IOA, AA, and silicone PSA as indicated in Table 3. The transfer tapes were laminated to the foam layer. Cold slam test results are also shown in Table 3.

COMPARATIVE EXAMPLE C-4

An adhesive transfer tape was made by coating the foam-like layer of Example 20 with a solvent based adhesive. The adhesive was made by mixing 87.4 parts IOA, 53.2 parts methyl acrylate, and 11.4 parts AA in 248 parts ethyl acetate with 0.46 part Vazo TM 64 initiator (available from DuPont) in a nitrogen atmosphere and heating at 55° C. for 24 hours with constant mixing. The solution was diluted to 21% solids, 0.5 part of a crosslinker was added, and the solution was coated onto the primed foam-like layer of Example 20 and dried. Test results are shown in Table 3.

TABLE 3

| Example | Composition - Parts by Weight | | Cold Slam (−40° C.) 3 Day RT Dwell Stage,S-F/Fail Mode |
|---|---|---|---|
| | IOA/AA Ratio | Acryl/Sil Ratio | |
| 20 | 95/5 | 70/30 | 5,1-2/FS |
| | | | 2-2/FS |
| 21 | 95/5 | 50/50 | 4,3-1/FS |
| | | | 7-1/FS |
| | | | 8-1/FS |
| | | | 14-1/FS |
| 22 | 86/14 | 70/30 | 4,6-2/FS |
| | | | 12-1/FS |
| | | | 5,2-1/FS |
| 23 | 85/15 | 70/30 | 4,10-1/FS |
| | | | 5,1-1/FS |
| | | | 2-1/FS |
| | | | 3-1/FS |
| 24 | 85/15 | 60/40 | 5,1-2/FS |
| | | | 2-1/FS |
| | | | 3-1/FS |
| 25 | 85/15 | 50/50 | 4,9-1/FS |
| | | | 10-1/FS |
| | | | 13-1/FS |
| | | | 5,2-1/FS |
| 26 | 80/20 | 50/50 | 4,7-1/FS |
| | | | 5,1-2/FS |
| | | | 2-1/FS |
| C-4 | — | | 2,9-2/POP |
| | | | 3,1-1/POP |
| | | | 3-1/FS |

The test results in Table 3 show superior cold slam test performance of the PSAs of the invention as compared to a solvent based acrylic adhesive.

EXAMPLES 27-31

The pressure-sensitive adhesives of these examples were made as in Example 1, without the triazine with varying amounts of IOA, AA, and silicone PSA. The pressure-sensitive adhesives were laminated to a foam-like layer as described in Example 20 and tested for peel adhesion and cold slam. Test results are shown in Table 4.

Table 4 shows the superior balance of adhesion, adhesion build, and cold slam properties of adhesives of the invention intended for automotive paint applications. The cold slam is still superior even though peel adhesion may be low in cases where the PSA coated substrate is removable.

TABLE 4

| Example | Composition parts by wt | | Peel Adhesion 50-J Paint-N/cm | | Peel Adhesion E-14 Paint-N/cm | | Cold Slam Stage,S-F/Fail Mode |
|---|---|---|---|---|---|---|---|
| | IOA/AA Ratio | Acryl/Sil Ratio | 20 min | 72 hr | 20 min | 72 hr | |
| 27 | 92/8 | 60/40 | 20.8 | 39.4 | — | — | 5,1-3/FS |
| | | | | | | | 3-1/FS |
| 28 | 90/10 | 50/50 | — | — | 24.2 | 29.2 | 5,1-3/FS |
| | | | | | | | 3,1/FS |
| 29 | 83/17 | 60/40 | 24.8 | 37.0 | 20.2 | 32.4 | 4,2-1/FS |

TABLE 4-continued

| Example | Composition parts by wt IOA/AA Ratio | Acryl/Sil Ratio | Peel Adhesion 50-J Paint-N/cm 20 min | 72 hr | Peel Adhesion E-14 Paint-N/cm 20 min | 72 hr | Cold Slam Stage.S-F/Fail Mode |
|---|---|---|---|---|---|---|---|
| 30 | 80/20 | 50/50 | — | — | 18.3 | 30.4 | 9-1/FS<br>13-1/FS<br>5,1-1/FS<br>4,2-1/FS<br>5,1-3/FS |
| 31 | 70/30 | 50/50 | — | — | 6.6 | 8.7 | 4,5-1/FS<br>6-1/FS<br>9-1/FS<br>5,2-1/FS |
| C-4 | | | — | — | 24.1 | 31.8 | 2,9-2/FS<br>3,1-1/FS<br>3-1/FS |

EXAMPLES 32-33

Foamlike tapes were made using the pressure-sensitive adhesive of Example 1 on the foam-like layer described in Example 20. Test results for cold slam are shown in Table 5.

The examples show the excellent cold slam performance of crosslinked adhesives of the invention compared to a solvent-based adhesive (C-4) and an acrylate adhesive without silicone (C-2).

TABLE 5

| Example | Composition - Parts by Weight IOA/AA Ratio | Acryl/Sil Ratio | Cold Slam (−40° C.) 3 Day RT Dwell Stage.S-F/Fail Mode |
|---|---|---|---|
| 32 | 85/15 | 70/30 | 4,9-1/FS<br>5,1-2/FS<br>2-1/FS |
| 33 | 80/20 | 50/50 | 4,6-1/FS<br>7-1/FS<br>8-1/FS<br>5,1-1/FS |
| C-2 | | | 0,0-2/POP<br>1,3-1/POP<br>2,3-1/POP |
| C-4 | | | 3,1-2/POP<br>2-2/FS |

EXAMPLES 34-35

Pressure-sensitive adhesive tapes were made as in Example 33 except that different crosslinking agents were employed. Each tape was laminated to the foam-like layer of Example 5. The tapes were tested for static shear and adhesion.

The adhesive of Example 34 was made as in Example 1 except that the triazine was omitted and 0.25 part, per hundred parts of acrylic monomer plus silicone, of gamma-glycidoxypropyltrimethoxy silane (available from Petrarch Systems, Inc.) was added to the mixture before coating.

The adhesive of Example 35 was crosslinked with triazine as described in Example 1. Example 5 was not crosslinked.

Results in Table 6 show that the adhesive of the invention can be crosslinked to improve the static shear properties without deleteriously affecting adhesion.

TABLE 6

| Example | Composition parts by wt IOA/AA Ratio | Acryl/Sil Ratio | Peel Adhesion 50-J Paint-N/cm 20 min | 72 hr | Static Shear minutes to failure |
|---|---|---|---|---|---|
| 34 | 80/20 | 50/50 | 32.6 | 46.9 | >10,000 |
| 35 | 80/20 | 50/50 | 27.5 | 47.3 | >10,000 |
| 5 | 80/20 | 50/50 | 30.0 | 62.2 | 275 |

EXAMPLES 36-41

The adhesives of Example 5, C-4 and GE 600 were laminated to the foam layer of Example 20, and tested on various substrates as shown in Table 7. The generic substrate test panels were obtained from the Precision Punch & Plastics Company of Minnetonka, Minn. The TPO is a thermoplastic polyolefin that is identified as Tadlar ™ thermoplastic polyolefin 88N809.

TABLE 7

| Example | Substrate | Peel Adhesion - N/cm Ex. 5 20 min | 90 hr | Ex. C-4 20 min | 90 hr | GE 600* 20 min | 90 hr |
|---|---|---|---|---|---|---|---|
| 36 | Polypropylene | 14.0 | 23.0 | 6.1 | 8.3 | 11.8 | 17.3 |
| 37 | Polycarbonate | 36.8 | 41.0 | 57.9 | 51.9 | 9.9 | 24.3 |
| 38 | LDPE | 13.3 | 18.6 | 3.3 | 5.7 | 12.3 | 17.5 |
| 39 | ABS | 25.0 | 33.3 | 29.3 | 41.8 | 14.9 | 21.7 |
| 40 | Epoxy | 21.0 | 33.1 | 21.5 | 33.1 | 11.0 | 21.0 |
| 41 | TPO | 17.3 | 18.9 | 5.7 | 3.3 | — | — |

*GE 600 is a solvent based polydimethyl silicone pressure sensitive adhesive composition from General Electric Company. The composition is mixed with 2% (by weight of silicone solids) of dichlorobenzoyl peroxide, coated onto a release liner to provide a dry adhesive thickness of 0.05 mm. The coated adhesive was dried at 70° C. for 1 minute and cured at 165° C. for 2 minutes.

The results in Table 7 show acceptable to superior adhesion of the adhesive of the invention to a variety of polymeric substrates.

EXAMPLE 42-47

Pressure-sensitive adhesives were made as in Example 1 except that the ratios of the components were varied as shown in Table 8. Tapes were made by removing one of the liners and laminating the adhesive surface to a nonwoven backing as described in U.S. Pat. No. 3,121,021 (Copeland), incorporated by reference herein, that had been embossed. The other liner was removed and the resulting tape constructions were tested according to the test described above for the skin adhesion procedure. The results shown in Table 8 indicate that the adhesives of the invention are suitable for medical uses such as bandages as compared to a product having good commercial acceptability.

TABLE 8

| Example | Composition Parts by Weight | | Adhesion to Skin grams/25.4 mm | |
|---|---|---|---|---|
| | IOA/AA Ratio | Acryl/Sil Ratio | Init | 24 Hrs |
| 42 | 90/10 | 60/40 | 69 | 135 |
| 43 | 80/20 | 40/60 | 36 | 106 |
| 44 | 90/10 | 50/50 | 85 | 149 |
| 45 | 85/15 | 40/60 | 53 | 159 |
| 46 | 95/5 | 70/30 | 90 | 137 |
| 47 | 95/5 | 50/50 | 94 | 159 |
| Micropore TM tape* | — | | 25 | 120 |

*pressure-sensitive adhesive tape available from Minnesota Mining and Manufacturing Co.

EXAMPLES 48-54

Pressure-sensitive adhesive transfer tapes were made as described in Example 1 except that the IOA/AA ratios were varied and the acrylate/silicone ratios were varied. One of the liners was removed and the adhesive was laminated to a 0.2 mm thick polyurethane film as disclosed in U.S. Pat. No. 4,917,929, incorporated by reference herein, to provide a wound dressing. The coated wound dressing was sterilized with 3 megarads of gamma radiation. The tapes were tested for adhesion to skin.

The results shown in Table 9 indicate that the adhesives of the invention are suitable for medical uses such as wound dressing compared to a product having good commercial acceptability.

TABLE 9

| Example | Composition Parts by Weight | | Adhesion to Skin grams/25.4 mm | |
|---|---|---|---|---|
| | IOA/AA Ratio | Acryl/Sil Ratio | Init | 24 Hrs |
| 48 | 95/5 | 70/30 | 66 | 169 |
| 49 | 95/5 | 60/40 | 75 | 161 |
| 50 | 95/5 | 50/50 | 72 | 169 |
| 51 | 95/5 | 40/60 | 61 | 171 |
| 52 | 90/10 | 70/30 | 29 | 132 |
| 53 | 90/10 | 50/50 | 56 | 174 |
| 54 | 90/10 | 40/60 | 51 | 217 |
| Tegaderm TM | — | | 40 | 140 |

*Tegaderm TM is a wound dressing available from Minnesota Mining and Manufacturing Co.

EXAMPLES 55-58

Pressure sensitive adhesive transfer tapes ere made as in Example 1 except that the acrylic acid was omitted, 0.1 part of KB-1 (per hundred parts total of IOA and silicone PSA) and 0.075 part of the triazine of Example 1 (per hundred parts total of IOA and silicone PSA) were added. Various ratios of IOA/sil were made as shown in Table 10. Wound dressings were made as described in Example 48 and were tested for adhesion to skin. The test results in Table 10 show that the PSA of the invention is useful when the alkyl acrylate is used with no comonomer, and the resulting wound dressings are suitable for medical uses as compared to a product having good commercial acceptability.

TABLE 10

| Example | Composition Parts by Weight | | Adhesion to Skin grams/25.4 mm | |
|---|---|---|---|---|
| | IOA | Sil | Init | 24 hrs |
| 55 | 40 | 60 | 59 | 169 |
| 56 | 50 | 50 | 83 | 179 |
| 57 | 60 | 40 | 82 | 165 |
| 58 | 70 | 30 | 74 | 160 |
| Tegaderm TM | — | — | 44 | 137 |

EXAMPLES 59-62

Pressure sensitive adhesive transfer tapes were made as in Example 1 except that varying amounts of IOA and isobornyl acrylate (IBnA) were used instead of IOA/AA. The acryl/sil ratio was kept at 60/40, 0.1 phr KB-1 (per hundred parts total acrylic monomer and silicone PSA) was added and 0.075 part triazine of Example 1 was added. The tapes were made into wound dressing as in Example 48, and tested for skin adhesion. The adhesive compositions and test results in Table 11 show that the adhesive of the invention having a nonpolar commomer is useful for making wound dressings as compared to a commercially acceptable product.

TABLE 11

| Example | Composition Parts by Weight | | Adhesion to Skin grams/25.4 mm | |
|---|---|---|---|---|
| | IOA/IBnA Ratio | Acryl/Sil Ratio | Init | 24 hrs |
| 59 | 95/5 | 60/40 | 69 | 193 |
| 60 | 90/10 | 60/40 | 86 | 191 |
| 61 | 85/15 | 60/40 | 69 | 184 |
| 62 | 80/20 | 60/40 | 64 | 196 |
| Tegaderm TM | | | 44 | 137 |

While this invention has been described in connection with specific embodiments, it should be understood that it is capable of further modification. The claims herein are intended to cover those variations which one skilled in the art would recognize as the chemical equivalent of what has been described here.

What is claimed is:

1. A radiation curable pressure-sensitive adhesive composition comprising:
   (a) from about 5 parts to about 95 parts by weight of acrylic monomer wherein said acrylic monomer comprises:
      (i) from about 50 to about 100 parts by weight of alkyl acrylate monomer, the alkyl groups of which have an average of 4 to 12 carbon atoms; and
      (ii) correspondingly from about 50 parts to about 0 parts by weight of a monoethylenically unsaturated copolymerizable modifier monomer;
      wherein said amounts of (i) and (ii) are selected such that the total amount of (i) plus (ii) equals 100 parts by weight of said acrylic monomer;
   (b) correspondingly from about 95 parts to about 5 parts by weight of silicon pressure-sensitive adhesive;
   wherein the amounts of (a) and (b) are selected such that the total amount of (a) plus (b) equals 100 parts by weight;
   (c) about 0 part to about 5 parts by weight of a photoinitiator based upon 100 parts by weight of said acrylic monomer; and
   (d) about 0 to about 5 parts by weight of a crosslinker based upon 100 parts by weight of (a) plus (b);

wherein the pressure-sensitive adhesive composition contains less than about 1 weight percent of a solvent based upon the total weight of the pressure-sensitive adhesive composition.

2. A pressure-sensitive adhesive comprising a radiation cured pressure-sensitive adhesive composition, wherein said pressure-sensitive adhesive composition comprises:
 (a) from about 5 parts to about 95 parts by weight of acrylic monomer wherein said acrylic monomer comprises:
  (i) from about 50 to about 100 parts by weight of alkyl acrylate monomer, the alkyl groups of which have an average of 4 to 12 carbon atoms; and
  (ii) correspondingly from about 50 parts to about 0 parts by weight of a monoethylenically unsaturated copolymerizable modifier monomer;
  wherein said amounts of (i) and (ii) are selected such that the total amount of (i) plus (ii) equals 100 parts by weight of said acrylic monomer;
 (b) correspondingly from about 95 parts to about 5 parts by weight of silicon pressure-sensitive adhesive wherein the amounts of (a) and (b) are selected such that the total amount of (a) plus (b) equals 100 parts by weight;
 (c) about 0 part to about 5 parts by weight of a photoinitiator based upon 100 parts by weight of said acrylic monomer; and
 (d) about 0 to about 5 parts by weight of a crosslinker based upon 100 parts by weight of (a) plus (b); wherein the pressure-sensitive adhesive composition contains less than about 1 weight percent of a solvent based upon the total weight of the pressure-sensitive adhesive composition.

3. A pressure-sensitive adhesive according to claim 2 wherein said pressure-sensitive adhesive composition comprises about 10 to about 90 parts by weight acrylic monomer and about 90 to about 10 parts by weight silicone pressure-sensitive adhesive.

4. A pressure-sensitive adhesive according to claim 2 wherein said pressure-sensitive adhesive composition comprises about 20 to about 80 parts by weight acrylic monomer and about 80 to about 20 parts by weight silicone pressure-sensitive adhesive.

5. A pressure-sensitive adhesive of claim 2 wherein said pressure-sensitive adhesive composition comprises about 30 to about 70 parts by weight acrylic monomer and about 70 to about 30 parts by weight silicone pressure-sensitive adhesive.

6. The pressure-sensitive adhesive of claim 2 wherein said acrylic monomer comprises about 60 to about 95 parts by weight alkyl acrylate monomer and about 40 to about 5 parts by weight modifier monomer.

7. The pressure-sensitive adhesive of claim 2 wherein said acrylic monomer comprises about 80 to about 95 parts by weight alkyl acrylate monomer and about 20 to about 5 parts by weight modifier monomer.

8. A pressure-sensitive adhesive comprising a radiation cured pressure-sensitive adhesive composition, wherein said pressure-sensitive adhesive composition comprises:
 (a) from about 25 parts to about 75 parts by weight of acrylic monomer wherein said acrylic monomer comprises:
  (i) from about 60 to about 98 parts by weight of alkyl acrylate monomer, the alkyl groups of which have an average of 4 to 12 carbon atoms; and
  (ii) correspondingly from about 40 parts to about 2 parts by weight of a monoethylenically unsaturated copolymerizable modifier monomer;
  wherein said amounts of (i) and (ii) are selected such that the total amount of (i) plus (ii) equals 100 parts by weight of said acrylic monomer;
 (b) correspondingly from about 75 parts to about 25 parts by weight of silicon pressure-sensitive adhesive wherein the amounts of (a) and (b) are selected such that the total amount of (a) plus (b) equals 100 parts by weight;
 (c) about 0 part to about 5 parts by weight of a photoinitiator based upon 100 parts by weight of said acrylic monomer; and
 (d) about 0 to about 5 parts by weight of a crosslinker based upon 100 parts by weight of (a) plus (b); wherein the pressure-sensitive adhesive composition contains less than about 1 weight percent of a solvent based upon the total weight of the pressure-sensitive adhesive composition.

9. The pressure-sensitive adhesive of claim 8 wherein said acrylic monomer comprises about 70 to about 95 parts alkyl acrylate monomer and about 30 to about 5 parts polar modifier monomer.

10. The pressure-sensitive adhesive of claim 8 wherein said acrylic monomer comprises about 75 to about 85 parts alkyl acrylate monomer and about 25 to about 15 parts polar modifier monomer.

11. The pressure-sensitive adhesive of claim 8 wherein said acrylic monomer comprises about 40 to about 60 parts by weight acrylic monomer and about 60 to about 40 parts by weight silicone pressure-sensitive adhesive.

12. The pressure-sensitive adhesive of claim 8 wherein said acrylic monomer comprises about 45 to about 55 parts by weight acrylic monomer and about 55 to about 45 parts by weight silicone pressure-sensitive adhesive.

13. A pressure-sensitive adhesive comprising a radiation cured pressure-sensitive composition, wherein said pressure-sensitive adhesive composition comprises:
 (a) from about 25 parts to about 75 parts by weight of acrylic monomer wherein said acrylic monomer comprises:
  (i) from about 50 to about 100 parts by weight of an alkyl acrylate monomer selected from the group consisting of isooctyl acrylate, 2-ethyl hexyl acrylate, butyl acrylate, and mixtures thereof; and
  (ii) correspondingly from about 50 parts to about 0 parts by weight of a monoethylenically unsaturated copolymerizable monomer selected from the group consisting of acrylic acid, acrylamide, isobornyl acrylate, N-vinyl-2-pyrrolidone, N-vinyl caprolactam, and mixtures thereof;
  wherein said amounts of (i) and (ii) are selected such that the total amount of (i) plus (ii) equals 100 parts by weight of said acrylic monomer;
 (b) correspondingly from about 75 parts to about 25 parts by weight of silicon pressure-sensitive adhesive wherein the amounts of (a) and (b) are selected such that the total amount of (a) plus (b) equals 100 parts by weight;
 (c) about 0 part to about 5 parts by weight of a photoinitiator based upon 100 parts by weight of said acrylic monomer; and (d) about 0 to about 5 parts by weight of a crosslinker based upon 100 parts by weight of (a) plus (b); wherein the pressure-sensitive adhesive composition contains less than about 1 weight percent of a solvent based upon the total weight of the pressure-sensitive adhesive composition.

14. The pressure-sensitive adhesive of claim 13 wherein said acrylic monomer comprises about 70 to about 100 parts alkyl acrylate monomer and about 30 to about 0 parts modifier monomer.

15. The pressure-sensitive adhesive of claim 13 wherein said acrylic monomer comprises about 80 to about 100 parts alkyl acrylate monomer and about 20 to about 0 parts modifier monomer.

16. A pressure-sensitive adhesive tape comprising a substrate coated on at least a portion of one side with the pressure-sensitive adhesive of claim 2.

17. A pressure-sensitive adhesive tape comprising a substrate coated on at least a portion of one side with the pressure-sensitive adhesive of claim 2 wherein said substrate is selected from the group consisting of non-woven materials, foils, glass, cloth, and polymeric films and foams.

18. A pressure-sensitive adhesive tape comprising a substrate coated on at least a portion of one side with the pressure-sensitive adhesive of claim 13 wherein said substrate is selected from the group consisting of rayon, polyolefins, polyesters, cotton, and polyurethanes.

19. A pressure-sensitive adhesive tape comprising a substrate coated on at least a portion of one side with the pressure-sensitive adhesive of claim 8 wherein said substrate comprises a foam layer.

20. A pressure-sensitive adhesive tape according to claim 19 wherein said foam layer comprises a radiation polymerized acrylic copolymer.

21. A pressure-sensitive adhesive tape according to claim 20 wherein said radiation polymerized acrylic copolymer comprises:

(a) from about 80 parts to about 99 parts by weight of an alkyl acrylate monomer, the alkyl groups of which have an average of 4 to 12 carbon atoms, and (b) correspondingly, from about 20 parts to about 1 parts by weight of a monoethylenically unsaturated strongly polar copolymerizable monomer.

22. The pressure-sensitive adhesive tape of claim 19 wherein said foam layer comprises a polymeric material selected from the group consisting of polyethylene, polypropylene, polyacrylates, neoprene, polyolefin, silicone, and polyurethane.

23. The pressure-sensitive adhesive of claim 2 wherein said adhesive composition further comprises from about 0.01 to about 5 parts by weight of a cross-linking agent based upon 100 parts by weight of the weight of said acrylic monomer plus said silicone pressure-sensitive adhesive.

24. The pressure-sensitive adhesive composition of claim 1 wherein said silicone pressure-sensitive adhesive comprises the intercondensation product of a polydiorganosiloxane and a silanol functional copolymeric silicone resin.

25. The pressure-sensitive adhesive of claim 2 wherein said silicone pressure-sensitive adhesive comprises the intercondensation product of a polydiorganosiloxane and a silanol functional copolymeric silicone resin.

26. The pressure-sensitive adhesive of claim 25 wherein said polydiorganosiloxane comprises polydimethylsiloxane.

27. A method of preparing a pressure-sensitive adhesive comprising the step of:

(a) combining (I) from about 5 parts to about 95 parts by weight of acrylic monomer wherein said acrylic monomer comprises:

(i) from about 50 to about 100 parts by weight of alkyl acrylate monomer, the alkyl groups of which have an average of 4 to 12 carbon atoms; and (ii) correspondingly from about 50 parts to about 0 parts by weight of a monoethylenically unsaturated copolymerizable modifier monomer; wherein said amounts of (i) and (ii) are selected such that the total amount of (i) plus (ii) equals 100 parts by weight of said acrylic monomer;

(II) correspondingly from about 95 parts to about 5 parts by weight of silicone pressure-sensitive adhesive; wherein the amounts of (I) and (II) are selected such that the total amount of (I) plus (II) equals 100 parts by weight; and (III) about 0 parts to about 5 parts by weight of a photoinitiator based upon 100 parts of said acrylic monomer;

in order to form a pressure-sensitive adhesive composition; wherein the pressure-sensitive adhesive composition contains less than about 1 weight percent of a solvent based upon the total weight of the pressure-sensitive adhesive composition;

(b) coating said pressure-sensitive adhesive composition onto a substrate; and (c) exposing said adhesive composition to radiation until said adhesive composition is substantially cured.

28. The pressure-sensitive adhesive of claim 23 wherein said crosslinker is selected from the group consisting of multifunctional acrylates, substituted triazines, silane coupling agents, benzophenone, and mixtures thereof.

29. The pressure-sensitive adhesive of claim 13 wherein said acrylic monomer comprises about 40 to about 60 parts by weight acrylic monomer and about 60 to about 40 parts by silicone PSA.

* * * * *

UNITED STATES PATENT AND TRADEMARK OFFICE
CERTIFICATE OF CORRECTION

PATENT NO. : 5,308,887
DATED : May 3, 1994
INVENTOR(S) : Chan U. Ko, Mark D. Purgett, Kurt C. Melancon, Donald H. Lucast, and Daniel K. McIntyre It is certified that error appears in the above-identified patent and that said Letters Patent is hereby corrected as shown below:

Column 27, line 31, "about 0 to about 5 parts" should read --about 0.01 to about 5 parts--;

Column 28, line 10, "silicon" should read --silicone--;

Column 28, line 62, "silicon" should read --silicone--; and

Column 30, line 15, "step" should read --steps--.

Signed and Sealed this

Thirteenth Day of July, 1999

Attest:

Q. TODD DICKINSON

Attesting Officer

Acting Commissioner of Patents and Trademarks